US009547855B2

(12) United States Patent
Beadle et al.

(10) Patent No.: US 9,547,855 B2
(45) Date of Patent: Jan. 17, 2017

(54) GESTURE-BASED DEVICE

(71) Applicant: Maxwell Forest Pty Ltd., Toorak VIC (AU)

(72) Inventors: Henry William Peter Beadle, Chipping Norton (AU); Matthew Charles Denton, Bronte (AU)

(73) Assignee: Maxwell Forest Pty Ltd (AU)

( * ) Notice: Subject to any disclaimer, the term of this patent is extended or adjusted under 35 U.S.C. 154(b) by 0 days.

(21) Appl. No.: 15/145,663

(22) Filed: May 3, 2016

(65) Prior Publication Data

US 2016/0247137 A1 Aug. 25, 2016

Related U.S. Application Data

(63) Continuation of application No. 14/311,095, filed on Jun. 20, 2014, now Pat. No. 9,361,618, which is a (Continued)

(51) Int. Cl.
*G06Q 20/40* (2012.01)
*G06Q 20/32* (2012.01)
(Continued)

(52) U.S. Cl.
CPC .......... *G06Q 20/322* (2013.01); *G06F 3/017* (2013.01); *G06F 3/0346* (2013.01);
(Continued)

(58) Field of Classification Search
CPC ................ G07C 9/00007; G07C 2009/0096; G06F 3/017; G06F 3/038; G06F 2203/0383; G06Q 30/0609; G06Q 30/08; G06Q 20/12; G06Q 20/16; G06Q 20/32; G06Q 20/3825; G06Q 20/401
See application file for complete search history.

(56) References Cited

U.S. PATENT DOCUMENTS 7,173,604 B2 2/2007 Marvit et al.
7,774,155 B2 8/2010 Sato et al.
(Continued)

FOREIGN PATENT DOCUMENTS

CN 102143482 A 8/2011

OTHER PUBLICATIONS

Australian Office Action, Australian Application No. 2014203705, Sep. 16, 2014, 6 pages.
(Continued)

*Primary Examiner* — Christopher E Leiby
(74) *Attorney, Agent, or Firm* — Fenwick & West LLP (57) ABSTRACT

The use of gestures on a user device to interact with and obtain functionality from remote communication hub devices is disclosed. A user device includes an accelerometer or other motion detection device and a wireless communications capability. The device is small enough to be placed conveniently about the person and communicates with a communication hub device to perform context-dependent actions. A user makes a gestural command to the device. The device interprets the gesture and undertakes activity. The gestural sensing device may be a motion switch, a multi-axis accelerometer, a video camera, a variable capacitance device, a magnetic field sensor, an electrical field sensor etc. When combined with business logic running on a remote computer system, the device can be used to implement a range of applications and services.

17 Claims, 5 Drawing Sheets

Related U.S. Application Data continuation of application No. PCT/IB2012/003048, filed on Dec. 21, 2012.

(60) Provisional application No. 61/578,837, filed on Dec. 21, 2011.

(51) Int. Cl.

| | | |
|---|---|---|
| *G06F 3/01* | (2006.01) | |
| *G07C 9/00* | (2006.01) | |
| *G06Q 20/12* | (2012.01) | |
| *G06Q 20/16* | (2012.01) | |
| *G06Q 20/38* | (2012.01) | |
| *G06Q 30/06* | (2012.01) | |
| *G06Q 30/08* | (2012.01) | |
| *G06F 3/0346* | (2013.01) | |
| *G07F 9/02* | (2006.01) | |
| *G06Q 20/10* | (2012.01) | |

(52) U.S. Cl.
CPC .......... *G06Q 20/105* (2013.01); *G06Q 20/12* (2013.01); *G06Q 20/16* (2013.01); *G06Q 20/32* (2013.01); *G06Q 20/3825* (2013.01); *G06Q 20/40* (2013.01); *G06Q 20/401* (2013.01); *G06Q 20/40145* (2013.01); *G06Q 30/0609* (2013.01); *G06Q 30/08* (2013.01); *G07C 9/00007* (2013.01); *G07F 9/026* (2013.01); *G06F 2203/0383* (2013.01); *G07C 2009/0096* (2013.01)

(56) References Cited

U.S. PATENT DOCUMENTS

| | | | |
|---|---|---|---|
| 2005/0212749 A1 | 9/2005 | Marvit et al. | |
| 2007/0259716 A1* | 11/2007 | Mattice | G06F 3/013 463/36 |
| 2007/0259717 A1* | 11/2007 | Mattice | A63F 3/00157 463/36 |
| 2009/0262074 A1 | 10/2009 | Nasiri et al. | |
| 2009/0303204 A1* | 12/2009 | Nasiri | A63F 13/06 345/184 |
| 2010/0027521 A1* | 2/2010 | Huber | G06Q 20/1235 370/338 |
| 2010/0082490 A1 | 4/2010 | Rosenblatt et al. | |
| 2011/0187505 A1 | 8/2011 | Faith et al. | |
| 2011/0282785 A1 | 11/2011 | Chin | |
| 2012/0081294 A1* | 4/2012 | Dinh | G06F 3/03547 345/169 |
| 2012/0215701 A1* | 8/2012 | Mehta | G06Q 20/12 705/75 |

OTHER PUBLICATIONS

Bartolomeo, G. et al., "The Simplicity Device: Your Personal Mobile Representative," Workshop on Pervasive Mobile Interaction Devices (PERMID 2006), 2006, eight pages, XP055239253. [Online] [Retrieved Jan. 7, 2016] Retrieved from the Internet <URL: http://www.medien.ifi.lmu.de/pubdb/publications/pub/bartolomeo2006permid/- bartolomeo2003permid.pdf.>.

European Patent Office, Search Report and Opinion, European Patent Application No. 12860144.0, Jan. 14, 2016, fourteen pages.

European Patent Office, Supplementary Search Report, European Patent Application No. 12860144.0, Aug. 7, 2015, five pages.

Gillian, N. et al., "Recognition of Multivariate Temporal Musical Gestures Using N-Dimensional Dynamic Time Warping," Proceedings of the International Conference on New Interfaces for Musical Expression, May 30, 2011-Jun. 1, 2011, pp. 337-342, XP055205232, Oslo, Norway.

PCT International Search Report and Written Opinion, PCT Application No. PCT/IB2012/003048, Jun. 28, 2013, 10 pages.

Rekimoto, J. et al., "SyncTap: An Interaction Technique for Mobile Networking," in Lecture Notes in Computer Science, 2003, pp. 104-115, vol. 2795, XP055144490.

State Intellectual Property Office of the People's Republic of China, First Office Action, Chinese Patent Application No. 201280069583.2, May 23, 2016, 22 pages.

United States Office Action, U.S. Appl. No. 14/311,095, Jul. 27, 2015, 12 pages.

* cited by examiner

GESTURE-BASED DEVICE

CROSS-REFERENCE TO RELATED APPLICATIONS

This application is a continuation application of U.S. patent application Ser. No. 14/311,095, filed Jun. 20, 2014, which is a continuation application of international application PCT/IB2012/003048, filed Dec. 21, 2012, which claims the benefit of U.S. provisional application 61/578,837, filed on Dec. 21, 2011. Each of the above referenced applications is incorporated by reference herein in its entirety.

BACKGROUND

Field of the Invention

Described embodiments relate generally to a human-computer interaction device that detects a sequence of input gestures and selects actions based on a combination of the gestures, application, a current location, and the co-location of other users and objects.

Description of the Related Art

With the increasing importance of electronic modes of conducting personal and business affairs and increasing popularity of electronic entertainment, the instances of an individual needing to enter details into an electronic system in a structured way for transmission to another device or storage are increasing.

To use online shopping as an example, to use an online shopping service one typically must register with the website by providing identification, billing and delivery data for storage and later use by the merchant, or provide this data each time a transaction is performed. Even if the data is stored by the merchant, the user will need to go through a login process, entering her username and password, each time they access the site. This can be quite burdensome or boring for the person providing the data. Moreover with the popularity of portable computing devices, many of which do not have full-sized keyboards, this task requires some dexterity to perform. The result is that many users of online shopping services abandon their purchases, leading to lost sales by the merchant.

The online shopping paradigm also impacts how people conduct shopping in retail environments, and existing methods of payments centered around a single cash register may soon become outdated. Current payment methods using physical credit cards presented at point-of-sale (POS) terminals are not uniform and often not secure.

SUMMARY

Disclosed embodiments include devices and methods for using gestures on a user device to interact with and obtain functionality from remote communication hub devices. In various embodiments a user device includes an accelerometer or other motion detection device and a wireless communications capability. The device is small enough to be placed conveniently about the person or unobtrusively attached to an object, and is configured to communicate with a communication hub device in order to perform context-dependent actions.

In operation the user makes a gestural command to the device (for example by tapping it twice in quick succession). The device using an internal processor (or an external processor connected by a wireless link) interprets the gesture and undertakes some activity on the user's behalf because of the gesture. The gestural sensing device may be a motion switch, a multi-axis accelerometer, a video camera, a variable capacitance device, a magnetic field sensor, an electrical field sensor or other sensing device. When combined with business logic running on a remote computer system, the device can be used to implement a range of applications and services including information services, security services including access control, stored value or credit card electronic payment systems, points or objects in a game, remote controls for consumer electronics, retail loyalty schemes, industrial equipment and so forth.

DETAILED DESCRIPTION OF THE PREFERRED EMBODIMENTS

Figure 1:
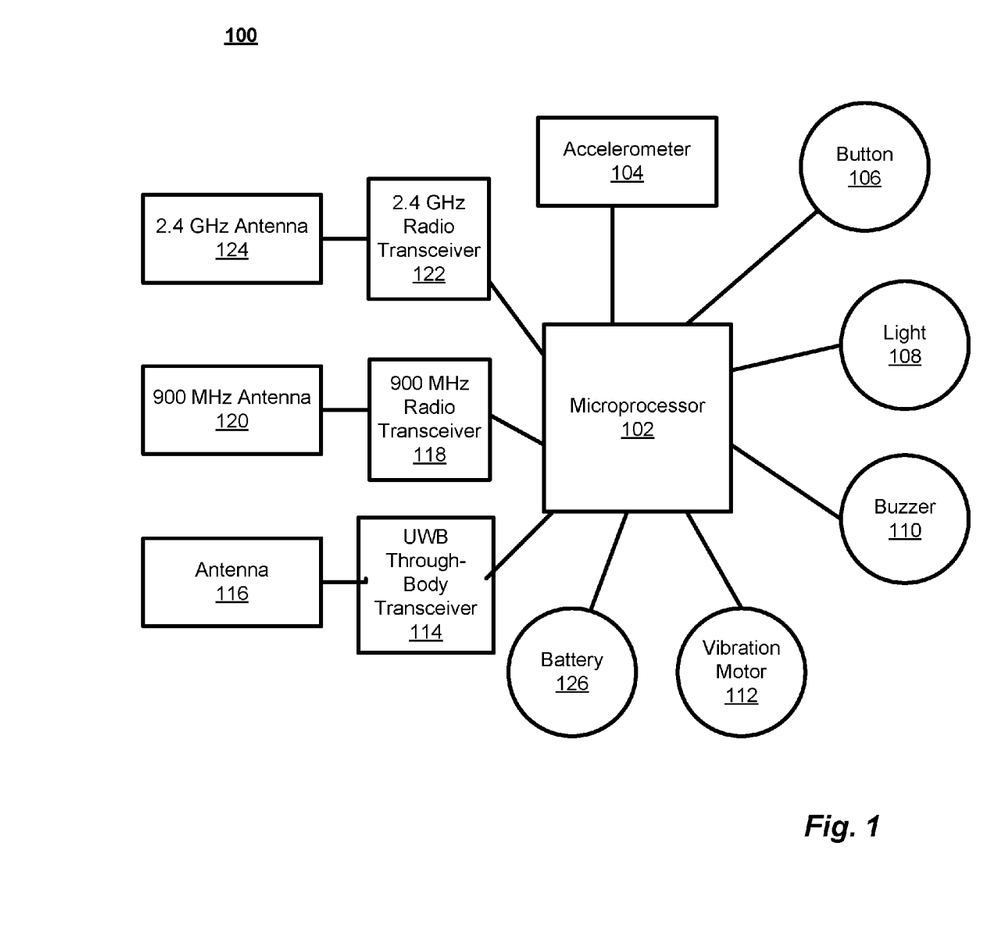
FIG. 1 is a schematic representation of a user device in accordance with one embodiment.

FIG. 1 illustrates an example of a user device 100 in accordance with one embodiment. The user device 100 includes a microprocessor 102; accelerometer 104; one or more buttons 106; a light 108; buzzer 110; vibrating motor 112; 2.4 GHz radio transceiver 122 and antenna 124; 900 MHz radio transceiver 118 and antenna 120; an ultra-wideband (UWB) through-body transceiver 114 and antenna 116; and a battery 126. In alternative embodiments, some of the illustrated components are not included—for example, in some embodiments, the user device includes a light but no buzzer or vibrator. The device may be, for example, a stand-alone device with a credit card form factor; a stand-alone device with a key-fob form factor; or a stand alone device with adhesive or screw mountings designed to be permanently attached to another object. The device can also be built into another device, for example a dog lead, mobile phone or mobile data tablet. The gesture recognition system and built-in sensors and actuators are configured to execute functionality based on inputs from the user or the sensors.

The user device 100 is configured to communicate with a communication hub device, as described below with respect to FIGS. 2-6. Communication is initiated by either the user device 100 or the communication hub device 202 (FIG. 2), depending on context as described further below.

The presence of multiple radio transceivers in the device (either physically or through software defined radio techniques) allows the device to adapt to the radio environment it finds itself in. A short range 2.4 GHz radio can be used to indicate physical presence and interact within a small area while a longer range 900 MHz radio can be used to indicate physical presence and interact within a larger area or through more obstructions.

Communication and interaction can be handed off from one radio system to another under control of the microprocessor to optimize system performance parameters including battery use, error rate and communications range.

The device forms part of a system of radio-enabled devices shown in the accompanying figures for 2.4 GHz devices operating over existing wireless systems including WiFi, Bluetooth and DECT. Protocols for devices utilizing the 900 MHz band are described in related U.S. patent application Ser. No. 61/547,729, and PCT application PCT/IB2012/002489, each of which is incorporated by reference herein in its entirety.

Figure 2:
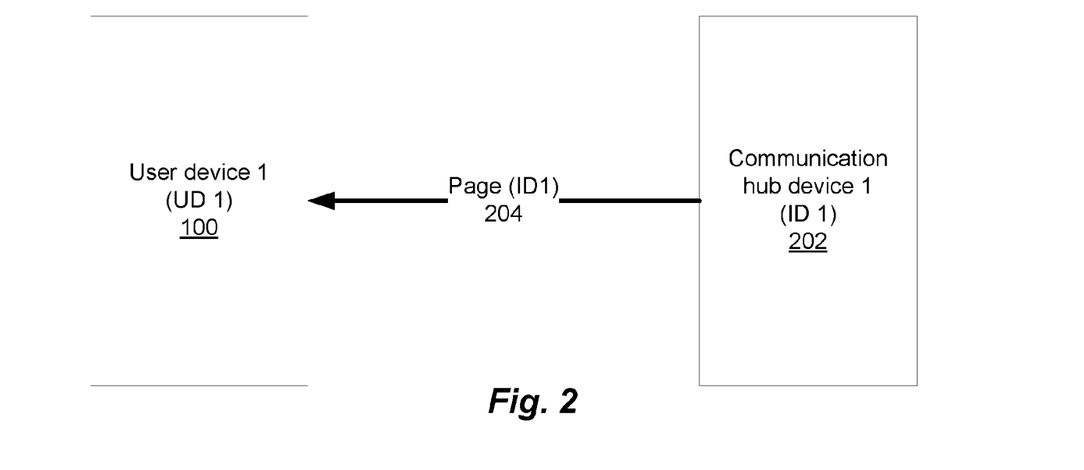
FIG. 2 illustrates communication between a communication hub device and a user device in accordance with one embodiment.

FIG. 2 is an interaction diagram illustrating communication between a communication hub device 202 and a user device 100. In various embodiments, the communication hub 202 has a higher capacity power source compared to the user device 100. A communication hub device 202 may be connected to or internal to, for example, a laptop computer used by the user to access online shopping through a browser application. Alternatively the communication hub device 202 may be a point of sale terminal, an advertising poster, a retail display rack or other relatively fixed infrastructure. In this embodiment the communication hub device 202 uses a larger power source (such as a bigger battery) or mains power enabling it to perform more power-intensive radio functions more frequently.

In another embodiment the communication hub 202 is mobile and enclosed in a smaller form factor. This could be a smart phone, an external device attached to a smartphone, a small self contained portable device or other portable device.

In one embodiment, the communication hub 202 transmits a page message 204 at regular intervals, providing its device identification number, e.g., ID1. The page message 204 is transmitted to allow other devices 100 to identify the existence of the transmitting device at a particular location. A user device 100 can receive the page message 204 as a wireless communication through its radio system 114, 118, 122, and may wake up the user device microprocessor 102 and process or store the page message 204 and communication hub identification. The decision to process or store can be based, for example, on the application that is being implemented using the communication hub and user devices, such as a stored value card, a point collection system for a game, or the implementation of a consumer product information collection system. The communication hub device 202 may also store the responses from the user device 100, which may contain information about the user device 100.

In one embodiment the ID and associated information is automatically collected and stored as the device 100 moves into and then stays within proximity of the communication hub 202, for example when browsing at a retail location.

An input gesture from the user device 100 may flag the stored ID and associated information as important or particularly relevant to the user, for example when collecting product information from a product on display at a retailer.

In another embodiment the device 100 being within proximity of the communication hub device 202 authenticates the user to access the communication hub device 202 to access the user's account, for example on an online banking portal or an online shopping portal.

Alternatively, an input gesture from the user device 100 can provide a final level of authorization to an application being executed on the communication hub device 202 allowing the user to access the user's account on the communication hub device 202, or complete a transaction in an online shopping transaction on the communication hub device 202.

Storage in various embodiments is to memory in the user device 100, typically implemented as EEPROM or flash memory. Upon receipt of the page message 204 the user device 100 knows that it is within range of the communication hub 202. In various embodiments, the user device 100 provides a signal to the user to indicate that the device 100 is in communication with the communication hub 202. This may include, for example, a flash of light from light 108, a buzz from buzzer 126 or a vibration from vibration motor 112.

Figure 3:
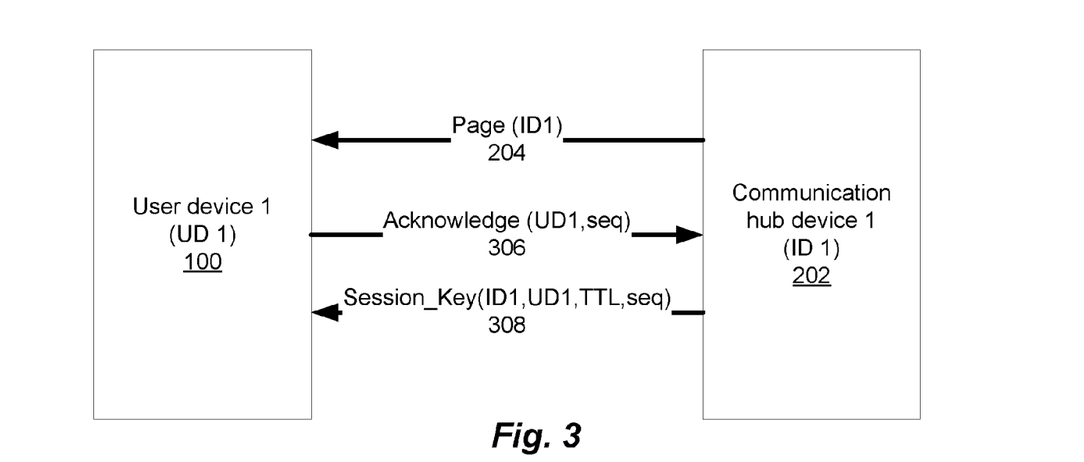
FIG. 3 illustrates communication between a communication hub device and a user device in accordance with one embodiment.

FIG. 3 illustrates an embodiment in which the user device 100 responds to the page message 204 and sends an acknowledgment message 306 to the communication hub 202. The communication hub 202 responds with a session key and time to live message 308 to be used to disambiguate future communications. The session key is valid for the amount of time in the time to live field. The communication hub 202 may perform other actions based upon the receipt of the acknowledge message 306, such as initiating a transaction in a retail system, performing a database lookup, unlocking the user device 100, logging into the user's account being accessed by the browser running on the user device 100, and recording the presence of the user device 100 in proximity to the communication hub in a loyalty card application. The user device 100 has a number of sensors and actuators integrated with one or more radio transceivers 114, 118, 122. It can be used to provide user interaction to multiple applications where the application (business) logic is implemented on a computer system remote to the user device 100. In such embodiments, performing a gesture such as a double tap (tap-tap), pushing a button 106 or simply being in a particular place or combination of place and time can cause the business logic to implement a particular action which is dependent on the user, the location, the gesture performed, the date and time and the presence or absence of other co-located users. The business logic is responsible for determining and implementing the required action based on the collection of information including, for example, the location, the gesture performed, the date and time and the presence or absence of other co-located users, collectively called the users context.

Figure 4:
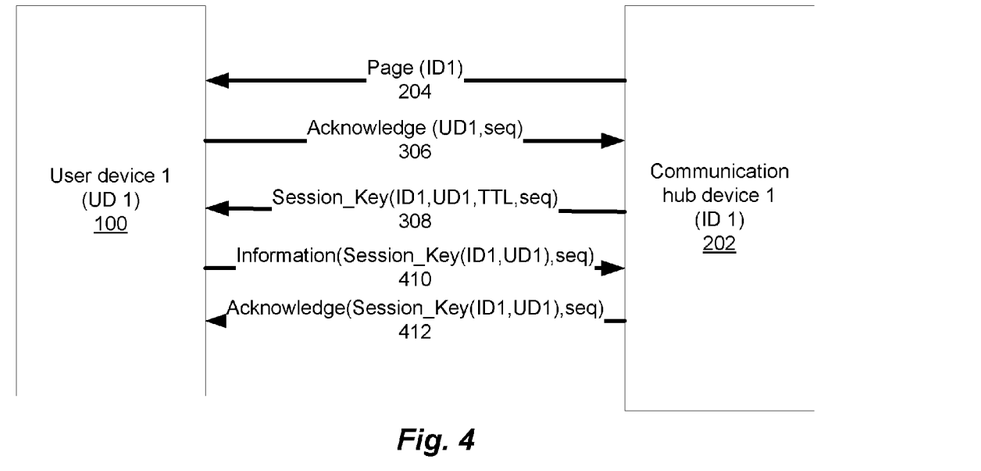
FIG. 4 illustrates the sending of information from a user device to a communication hub device in accordance with one embodiment.

FIG. 4 illustrates an embodiment in which the user device 100 explicitly sends information 410 to the communication hub 202. This may be in response to a user gesture command, for example. The communication hub 202 may then act on the information 410 in some way. In one embodiment, the communication hub 202 explicitly acknowledges receipt or the information with an acknowledge message 412.

This example illustrates the use of sequence numbers, which in one embodiment are monotonically increasing numbers generated by both sides of the communication starting with the user device 100 in the initial acknowledge message 306. Sequence numbers are used to detect lost messages. The user device 100 or the communication hub 202 maintains records of the last sequence number transmitted to and the last sequence number received from the other party. If the series of monotonically increasing sequence numbers is broken then the party identifying the break knows that a message has been transmitted but not received. This fact is revealed at the application layer on both devices and any corrective action is up to the application to implement. Possible corrective action could be to implement a reliable transport protocol like TCP or TP4 or to ignore the message.

Figure 5:
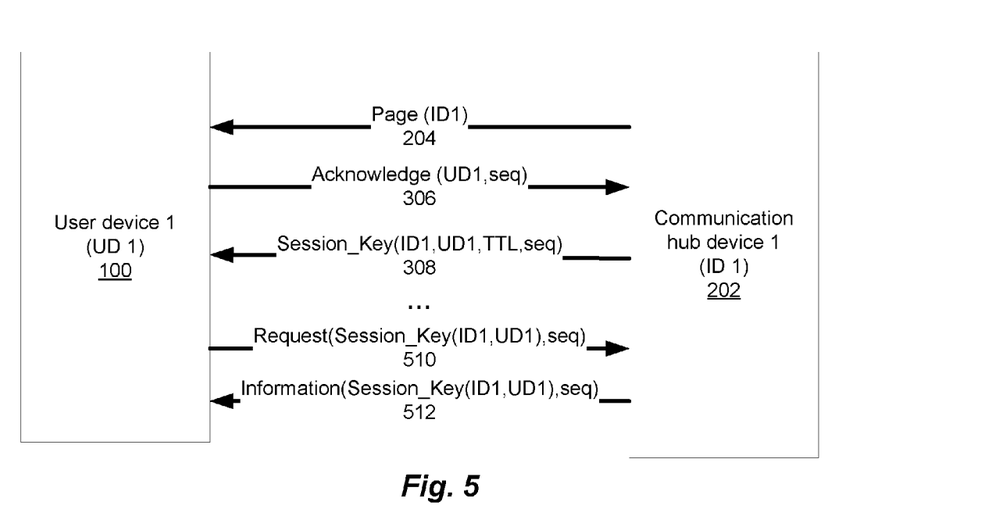
FIG. 5 illustrates the sending of a request message from a communication hub device to a user device in accordance with one embodiment.

FIG. 5 illustrates an embodiment in which, some time after the initial generation of a session key, the communication hub sends the user device 100 a request message 510. This could occur in a payment system where the request is a request for payment based on an out-of-band (human to human) communication. The user device 100 can choose to ignore the request if, for example, it is not addressed to it or if it is for a transaction that the user does not wish to complete; or reply to the request with an information message 512 providing the requested information. The structure of the content of the request 510 and the information messages are application dependent.

Figure 6:
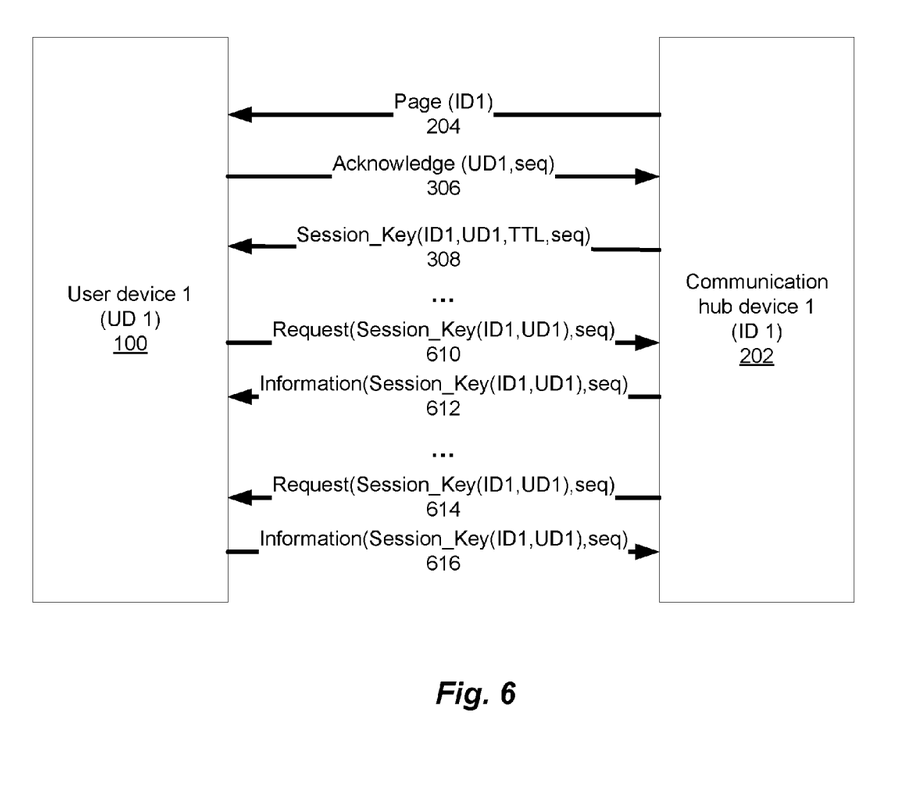
FIG. 6 illustrates the sending of a request from a user device to a communication hub device in accordance with one embodiment.

FIG. 6 illustrates a scenario where the user device 100 sends a request message 610 to the communication hub device 202. The message 610 could relate to the user device 100 approving a transaction being executed on the communication hub device. The user device 100 might continue to send this message until it received a message from the communication hub device 202 that the message had been received. Alternatively, the message could be related to a retail application and contain a request for a pre-defined order at a coffee shop. The communication hub 202 would send back a confirmation message 612 confirming the request and optionally providing additional information. Additional information could be cost, expected wait time, advertising material about the product, loyalty points earned, etc. In some situations the communication hub may send a request 614 to the user device 100 asking for payment. The user device 100 would send back an information message 616 containing the required payment information.

In various embodiments, communication between the user device and communication hub is initiated upon user input of a gesture. In various embodiments, and referring to FIG. 7, recognizing a gesture begins with sampling 702 the parameter that the sensor measures at intervals higher than the Nyquist rate of the gesture to be captured. Device 100 then uses a dynamic time warping algorithm (DTW) to correlate 704 the samples with templates for each gesture to be recognized and determine a correlation coefficient and error value. If 706 the correlation coefficient exceeds a pre-determined threshold and the error value is below a pre-determined threshold, then the gesture is classed 708 as recognized. If 706 none of the classification tests are satisfied then further samples are taken 710 from the sensor and the process repeated until a gesture is matched.

In a microprocessor implementation, in one embodiment a wake-on-change function is used to wake up the microprocessor 102 when the sensor value exceeds a predefined value, allowing power to be conserved.

Figure 7:
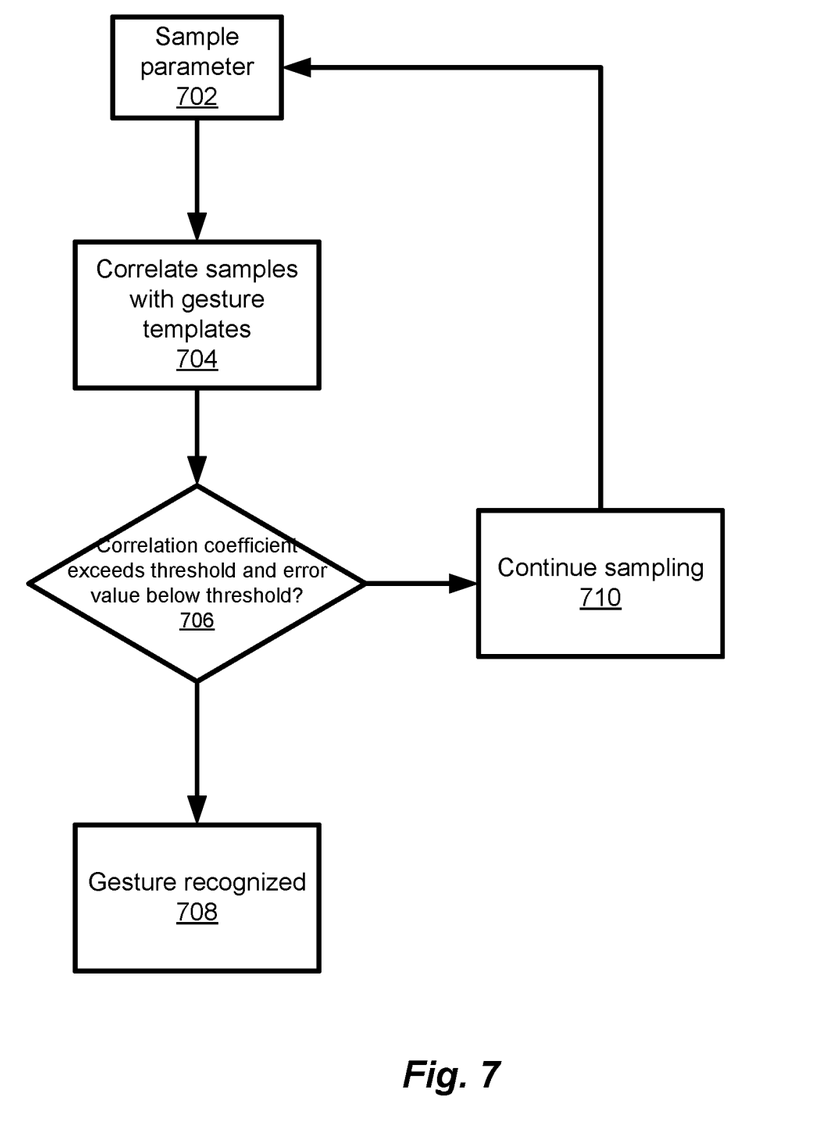
FIG. 7 is a flowchart illustrating a method for gesture recognition by a user device in accordance with one embodiment.

The device 100 may detect a range of different gestures for different actions, e.g., tap-tap for retail shopping transactions, a wave to auto-fill web forms, a key-unlock gesture to approve online payments or get access to secure accounts. In each case it is advantage of this invention is that a gesture can be defined which relates to the action be actuated and hence is intuitive for the user, reducing user resistance and providing them with an increased sense of security.

The device may also include other sensors for the user to provide additional input to the device, for example biometric input sensors including but not limited to fingerprint scanner, microphone with voiceprint analysis, touchpad with signature recognition, retinal scanner, etc., to further authenticate the user; or push buttons, and actuators for the device to provide feedback to the user, for example indicator lights, auditory indicators (buzzers) and tactile indicators (vibrators).

Once a gesture has been recognized the device 100 executes its stored program logic to respond to the gesture. Operations in response to a recognized gesture may include one or more of making a noise; flashing a light or using other actuators built into the device; transmitting information through a wireless link built into the device to a person or another computer system to effect a change in the environment, for example open a door, make a payment, or to control the actuators on the device, for example flash a light, make a noise or vibrate.

The actuators can be used to provide feedback based on the use of the gesture recognition, the use of the buttons, or in response to a communication received from the wireless connection.

The device can use its radio transceiver 114, 118, 122 to send or listen for periodic beacon messages and may interact with a remote person or computer system without the need for a gesture-based trigger (the presence of the device in a particular location may be sufficient to initiate the interaction and can be considered a degenerate gesture 'do nothing').

A further aspect is the ability to disambiguate user responses in crowded environments. In retail or other environments ambiguity can arise when two or more devices are simultaneously within range of a payment terminal.

In one embodiment, when a device comes within range of a payment terminal it communicates with the terminal in response to a terminal broadcast message. The terminal responds to the device with a session key. Multiple session keys can be active for a vendor terminal and multiple devices at one time. When a payment is requested by the vendor, the vendor terminal broadcasts the request including the session key. Only the device holding that matching session key responds to authorize the payment (using an existing stored value card protocol). If a vendor cannot differentiate between several devices currently enrolled, the vendor terminal can use the instantaneous relative signal strength of the connections to each device to determine the device closest to the vendor terminal (using an algorithm based on the distribution of relative signal strengths of all the devices with active session keys) and send the payment request using that devices session key. If there is no clear closest device then, the vendor can ask the customer currently being served to tap-tap their device, thus clearly identifying to the vendor terminal the session key associated with the transaction. The payment request can then be sent to the device with the associated session key.

In an alternate disambiguation system the payment request is sent to all devices with active session keys and only the device that corresponds to the user being served at the front of the queue responds. If the vendor terminal received multiple responses within a time window from the payment request then it disregards all responses and re-issues the payment request and repeats the process until it receives only one response within the time window. This allows for human social protocols to provide disambiguation and also allows for 'someone else to pick up your tab'.

In the case of multiple vendor terminals, multiple payment requests can be received by a single device in a small time window. The disambiguation process takes place on the device where the device looks at the relative signal strength of the connection with each vendor terminal and only responds to the payment request with the highest relative signal strength. If the relative signal strengths are similar then the device responds to none of the request and waits for the vendor terminal to re-issue the payment request. A human social protocol can then be used to remove the ambiguity (for example in a crowded market situation the vendor could ask the customer to move closer to the vendor terminal to remove the payment ambiguity).

Alternate disambiguation technologies can be used. For example biometric facial identification data can be stored on the device and transferred to the vendor terminal when an enrollment occurs. The vendor terminal uses a low cost video camera to capture the facial image of the customer immediately in front of the terminal (the one being served). The biometric is used to match with the biometric supplied by the device and the payment request is sent with the matching session key. If no biometrics match then a potential fraud alert can be generated.

Examples of applications and services include:

Example 1

In one embodiment, a payment system includes the device 100 located in a credit card form factor with two user pushable buttons 106 on the card and an audio actuator (buzzer) 110. The first time a user goes to a retailer, she takes out the card. For the local gas station, she pushes the "Connect Pay" button 106. The cashier also pushes his Connect Pay button and completes the first time authorization. From then on, the user can use a tap-tap or other gesture on her wallet (still in her pocket or hand bag) to pay for transactions. Through-the-wallet tapping works by using an accelerometer 104 in the card stored in the wallet to detect the accelerations associated with the displacement of the wallet when tapped. The dynamic time warping algorithm is then used to match the accelerometer 104 output against a series of templates associated with different gestures (e.g. tap tap-tap, TAP-tap, tap-tap-tap, tap-tap . . . tap, etc.) when a match is found a predefined (application dependent) action takes place.

In another embodiment, a user may log into their laptop and identify through a browser application certain goods that they would like to buy, at which point the application will request that they enter certain personal information such as name, address and credit card details. The user can then wave their wallet in which is held the user device 100 in a swiping gesture in order to "autofill" the personal data. The browser application will then ask the user to approve the purchase as a final check before processing payment and executing an order.

The user can then twist the hand holding the wallet in a "key-unlock" gesture as a means of approval.

In another embodiment, the user can wave the device 100 over a tablet or smartphone to provide personal information such as medical records or a history of recent personal activity such as exercise routine.

In another embodiment, the user can twist the hand holding the wallet in a "key-unlock" gesture over a laptop, smartphone or tablet as a means to further provide security information to the bank for a secure log-on or approval of a transaction. Security information may include username and password, a secure verifiable code such as a one time key, or other personal information.

In another embodiment, a user visits a café, and the first time she pushes the share button 106, a message is communicated from the user device 110 to the communication hub 202 giving the café permission to track the user's shopping while at their store, signing them up to their loyalty program. The user also has to push the Connect Pay button 106 on his device to complete the authorization process. The user can then tap-tap his wallet to pay for small transactions, plus he shares his spending and coffee preferences with the cafe, or any one of the shops in the chain. In one embodiment the user can also pre-order while waiting in the line.

Example 2

Exchanging Simple Information Between Two Friendly Devices

In this example a user bumps into a colleague while out for a walk in the park and is introduced to her friend.

To share user configurable contact information the user makes a tap-tapped gesture on her purse while it is still in her bag, as does the other party. The two wireless devices in their wallets or purses discover each other and share contact information, such as social network identities, across the wireless link.

When the user arrives home, the device 100 communicates with her home computer system (the communication hub) 202 and records the contact information for later use. Her new friend does not have a home computer system—her device uses her mobile phone to save the contact information for later use. The information is stamped with the date of the encounter and if available the location of the encounter.

Location Specific Information Exchange

Embodiments also include the option of modifying the environment to alert users that the device 100 can be used at a particular location. Modifications include a variable message display triggered by the reception of a radio message from the device or a graphic symbol and/or words in a sign or logo.

For example, a "Tap-Tap" symbol sign in a store window or near merchandise can indicate that a gesture to the device 100 (a tap-tap) could initiate a wireless connection to a computer or person associated with the location or merchandise.

The activity associated with the gesture is dependent on the context the gesture is performed in and on pre-stored user preferences. For example a tap-tap gesture when standing near a product displaying a Tap-Tap symbol could be configured in user preferences to e-mail information about the associated product to the user for one user; for another user it could be configured to load product information immediately into the user's smart phone; for another user it could be configured to request a sales call between 3:00 PM and 5:00 PM on the following day. What it does is dependent on the business logic and on the user's preferences.

In one example a gesture may gather information from the environment about the product in close proximity to the user (using short range radio location by adjacency, GPS or some other location technology) to establish his location.

In another example a gesture may request a staff member assist a customer at a location in a busy store, queuing in the system for the next available shop assistant.

In another example the gesture may provide information to the merchant along with a request to be contacted later about the product or service. These scenarios can be generalized to the provision and/or collection of information associated with a location and with potential additional context such as user preferences and merchant/provider preferences based on a gesture performed by the user using the device.

In another example the gesture may provide customer information to a merchant for use in a loyalty program.

Feedback

A further aspect involves using the device to provide feedback to the user based on context, user preferences and other externalities.

Example 3

When the device is used to make a payment in response to a user gesture, an audio response is provided to indicate that the payment has been successful or not successful. If successful the tone and cadence of the feedback response can be altered to indicate a low balance in the users account.

Example 4

In an industrial setting the device can be used to warn of the presence of hazardous areas by vibrating or beeping to alert the user when the user moves within a pre-determined range of a transceiver located in the environment. A gesture to the device can be used to acknowledge the receipt of the warning.

Other variations of feedback can be constructed for other applications and other feedback actuators.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for authorizing a transaction, the method comprising:
    tracking, by a mobile user device, movements of the mobile user device, the mobile user device in a form of a credit card;
    determining, by the mobile user device, whether the tracked movements include an authorization gesture; and
    responsive to determining that the tracked movements include the authorization gesture, transmitting, by the mobile user device, information to a mobile hub device, the mobile hub device awaiting authorization of an operation initiated by a user on the mobile hub device, the information causing the operation on the mobile hub device to be completed.

2. The computer implemented method of claim 1, wherein the operation initiated by the user on the mobile hub device is a transaction with a third party system.

3. The computer implemented method of claim 1, wherein the information is transmitted by the mobile user device to the mobile hub device via a connection initiated by the mobile user device.

4. The computer implemented method of claim 1, wherein the information is transmitted by the mobile user device to the mobile hub device via a connection initiated by the mobile hub device.

5. The computer implemented method of claim 1, wherein the transaction is a purchase transaction in respect of one or more items.

6. The computer implemented method of claim 1, wherein the operation is selected from a group comprising: an online payment transaction with a third party system; a transaction to access an account on a third party system; an operation to authenticate access to the mobile hub device; an operation to authorize an application being executed on the mobile hub device.

7. The computer implemented method of claim 1, wherein the information transmitted to the mobile hub device includes personal information of the user, the personal information of the user being used to complete the operation on the mobile hub device.

8. The computer implemented method of claim 7, wherein the operation involves one or more fields being presented to the user on the mobile hub device, and wherein the one or more fields are automatically filled based on the personal information transmitted to the mobile hub device.

9. The computer implemented method of claim 1, wherein the mobile user device includes one or more accelerometers and tracking movements comprises tracking accelerations associated with displacements of the mobile user device.

10. The computer implemented method of claim 1, wherein the mobile user device includes one or more motion detection devices for tracking movements of the mobile user device, and wherein the one or more motion detection devices are selected from a group comprising: a motion switch, a video camera, a variable capacitance device, a magnetic field sensor, and an electric field sensor.

11. The computer implemented method of claim 1, wherein the authorization gesture is selected from a group comprising: the user making one or more of tapping movements with the mobile user device; the user waving the mobile user device; the user simulating opening a lock using the mobile user device as a key.

12. The computer implemented method of claim 1, wherein the mobile hub device is a smartphone, laptop, or tablet.

13. The computer implemented method of claim 1, wherein the operation is completed responsive to the authorization gesture being performed and the mobile user device being within a certain distance from the mobile hub device.

14. The computer implemented method of claim 1, wherein the movements of the mobile user device are tracked in response to a broadcast message transmitted by the mobile hub device based on the operation, the broadcast message including a first session key and the transmitted information including a second session key matching the first session key.

15. The computer implemented method of claim 1, wherein determining whether the tracked movements include the authorization gesture comprises:
  storing a plurality of templates, each of the plurality of templates associated with a different gesture and indicating movements of the mobile user device corresponding to the associated gesture, an authorization template associated with the authorization gesture included in the plurality of templates;
  calculating, for each of the plurality of templates, a correlation coefficient based on correlation of the tracked movements to the template;
  calculating, for each of the plurality of templates, an error value based on correlation of the tracked movements to the template; and
  responsive to the correlation coefficient calculated for the authorization template being above a correlation threshold and the error value calculated for the authorization template being below an error threshold, determining that the tracked movements include the authorization gesture.

16. The method of claim 15, wherein correlation of the tracked movements to each of the plurality of templates is determined using a dynamic time warping algorithm.

17. A non-transitory computer readable storage medium storing computer-executable instructions which when executed by one or more processor cause the one or more processors to perform steps comprising:
  tracking, by a mobile user device, movements of the mobile user device, the mobile user device in a form of a credit card;
  determining, by the mobile user device, whether the tracked movements include an authorization gesture; and
  responsive to determining that the tracked movements include the authorization gesture, transmitting, by the mobile user device, information to a mobile hub device, the mobile hub device awaiting authorization of an operation initiated by a user on the mobile hub device, the information causing the operation on the mobile hub device to be completed.

* * * * *

UNITED STATES PATENT AND TRADEMARK OFFICE
CERTIFICATE OF CORRECTION

| | | |
|---|---|---|
| PATENT NO. | : 9,547,855 B2 | Page 1 of 1 |
| APPLICATION NO. | : 15/145663 | |
| DATED | : January 17, 2017 | |
| INVENTOR(S) | : Henry William Peter Beadle and Matthew Charles Denton | |

It is certified that error appears in the above-identified patent and that said Letters Patent is hereby corrected as shown below:

In the Claims

Claim 6, Column 11, Line 13, insert --and-- after --device;--.
Claim 11, Column 11, Line 41, insert --and-- after --device;--.

Signed and Sealed this
First Day of August, 2017

Joseph Matal
*Performing the Functions and Duties of the*
*Under Secretary of Commerce for Intellectual Property and*
*Director of the United States Patent and Trademark Office*